United States Patent [19]

Tomitaka et al.

[11] Patent Number: 5,087,526

[45] Date of Patent: Feb. 11, 1992

[54] BIAXIALLY ORIENTED POLYESTER FILM FOR USE IN FLOPPY DISC

[75] Inventors: Kichinojo Tomitaka, Nagahama; Masumi Koizumi, Kawasaki, both of Japan

[73] Assignee: Diafoil Company, Limited, Tokyo, Japan

[21] Appl. No.: 599,813

[22] Filed: Oct. 18, 1990

[30] Foreign Application Priority Data

Oct. 24, 1989 [JP] Japan .................. 1-276228

[51] Int. Cl.$^5$ .................. B32B 27/06; B32B 27/00
[52] U.S. Cl. .................. 428/480; 264/235.8; 428/220; 428/910
[58] Field of Search .................. 428/480, 910, 220; 264/235.8

[56] References Cited

U.S. PATENT DOCUMENTS 4,960,636 10/1990 Tomitaka et al. .................. 428/220
4,985,537 1/1991 Utsumi et al. .................. 528/272

*Primary Examiner*—Merrell C. Cashion, Jr.
*Assistant Examiner*—D. S. Nakarani
*Attorney, Agent, or Firm*—David G. Conlin; David S. Resnick

[57] ABSTRACT

The present invention provide a biaxially oriented polyester film for use in a floppy disc, which has a coefficient of thermal expansion ($\alpha_T$) in film plane of $(1.0 \pm 0.5) \times 10^{-5}$ mm/mm/°C. and a heat shrinkage of not higher than 0.09% after treatment the film for 72 hours under conditions of a temperature of 60° C. and a humidity of 80% RH in any directions in film plane, and simultaneously satisfies the following equations (1) to (5):

$$1.490 \leq n_\alpha \leq 1.500 \tag{1}$$

$$0.155 \leq \Delta P \leq 0.168 \tag{2}$$

$$1.600 \leq \bar{n} \leq 1.603 \tag{3}$$

$$40 \leq X_{100} \leq 60 \tag{4}$$

$$1.385 \leq \rho \leq 1.400 \tag{5}$$

wherein $n_\alpha$ represents a refractive index in film thickness direction, $\Delta P$ represents a degree of planar orientation, $\bar{n}$ represents an average refractive index, $X_{100}$ represents a crystal size (Å) of (110) face, and $\rho$ represents a density (g/cm$^3$). The biaxially oriented polyester film of the present invention has excellent dimensional stability and flatness and is suitable for use as the base film of floppy disc.

4 Claims, No Drawings

BIAXIALLY ORIENTED POLYESTER FILM FOR USE IN FLOPPY DISC

BACKGROUND OF THE INVENTION

The present invention relates to a biaxially oriented polyester film for floppy disc which is excellent in dimensional stability and flatness.

Polyester film is used favorably for various purposes and particularly useful as base film for floppy disc. With progress in densification of floppy disc medium in recent years, a medium has been required to be small in dimensional change under severe environments, particularly small in reversible thermal expansion and irreversible heat shrinkage.

To meet this requirement, a method in which coefficient of thermal expansion of polyester film used as base film is lowered has been generally employed. More specifically, a heat-set biaxially stretched film having an enlarged refractive index or a reduced crystallinity (Reports on Progress in Polymer Physics in Japan, vol. XXIII, 1980). However, in this technique, although a coefficient of thermal expansion can be reduced to a desired extent, heat shrinkage becomes unfavorably large.

For reducing irreversible thermal shrinkage, a method in which a heat-set biaxially stretched polyester film is further subjected to an off-line heat treatment with relaxation is usually employed (Japanese Patent Publication (KOKOKU) 10769(1983) and Japanese Patent Application Laid-Open (KOKAI) Nos. 57-15927(1982) and 59-127233(1984)). However, although a film having a lower heat shrinkage can be obtained by this technique, there has been problems of low production efficiency, such as low workability, which leads to a high production cost and poor flatness of the obtained film. Improvement, therefore, has been required.

SUMMARY OF THE INVENTION

The present inventors have made an extensive studies for solving these prior art problems and have found that a polyester film having certain specific properties is small in a coefficient of thermal expansion, has an irreversible heat shrinkage as low as that realized by off-line treatment, has a good flatness and is useful as a polyester film for use in high-density floppy disc. The present invention has been accomplished based on these findings.

The present invention relates to a biaxially oriented polyester film for use in a floppy disc, which has a coefficient of thermal expansion ($\alpha_T$) in film plane of $(1.0\pm0.5)\times 10^{-5}$ mm/mm/°C. and a heat shrinkage of not higher than 0.09% after treating the film for 72 hours under conditions of a temperature of 60° C. and a humidity of 80% RH in any directions in film plane, and simultaneously satisfies the following equations (1) to (5):

$1.490 \leq n_\alpha \leq 1.500$      (1)

$0.155 \leq \Delta P \leq 0.168$      (2)

$1.600 \leq \bar{n} \leq 1.603$      (3)

$40 \leq X_{100} \leq 60$      (4)

$1.385 \leq \rho \leq 1.400$      (5)

wherein $n_{60}$ represents a refractive index in film thickness direction, $\Delta P$ represents a degree of planar orientation, $\bar{n}$ represents an average refractive index, $X_{100}$ represents a crystal size (Å) of (110) face, and $\rho$ represents a density (g/cm$^3$).

DETAILED DESCRIPTION OF THE INVENTION

The term "polyester" used in the present invention refers to a crystalline aromatic polyester which is produced by polycondensation of an aromatic dicarboxylic acid such as terephthalic acid, isophthalic acid and naphthalene-2,6-dicarboxylic acid or a ester thereof and a diol such as ethylene glycol, diethylene glycol, tetramethylene glycol and neopentyl glycol. The crystalline aromatic polyester can be produced by a method of direct polycondensation of an aromatic dicarboxylic acid and a glycol, as well as a method in which polycondensation is carried out after subjecting a dialkyl ester of an aromatic dicarboxylic acid to ester interchange reaction with a glycol or a method in which a diglycol ester of an aromatic dicarboxylic acid is polycondensed.

Typical examples of the crystalline aromatic polyester may include polyethylene terephthalate, polyethylene-2,6-naphthalate, polytetramethylene terephthalate and polytetramethylene-2,6-naphthalate. The crystalline aromatic polyester used in the present invention may be a homopolyester or a copolyester. For example, polyethylene terephthalate or polyethylene-2,6-napthlate includes not only respective homopolyester in which terephthalic acid or naphthalene-2,6-dicarboxylic acid is polycondensed with ethylene glycol, but also a copolyester in which 80 mol % or more of the constitutional repeating units comprises ethylene terephthalate unit or ethylene 2,6-naphthalate units, and 20 mol % or less of the constitutional repeating units comprises other units. Further, the crystalline polyester may be a mixed polyester in which other polymers such as polycarbonate, polyamide, polyolefin, etc., are mixed with the polyester mentioned above.

In the present invention, an excessively low polymerization degree of the polyester leads to deterioration in mechanical properties of the polyester film, so that the polyester is preferred to have an intrinsic viscosity of 0.40 or above, preferably 0.50 to 0.90, more preferably 0.55 to 0.85.

The polyester may contain fine particles to provide the produced film with slipperiness. As the particles for providing slipperiness, there may be mentioned known inactive external particles such as kaolin, silica, calcium carbonate, silicon oxide, aluminum oxide and the like. The amount of the fine particles to be contained is preferably 0.001 to 10% by weight based on the amount of the polyester and the average particle size is preferably 0.001 to 10 μm.

The coefficient of thermal expansion ($\alpha_T$) in any direction in the film plane is in the range of $(1.0\pm0.5)\times 10^{-5}$ mm/mm/°C. In a film in which $\alpha_T$ is outside the range, the difference between $\alpha_T$ and the coefficient of thermal expansion of a magnetic head becomes too large, making it difficult to increase track density, so that such a film is not suitable for use in a high-density floppy disc. The more preferred range of $\alpha_T$ of the film of this invention is $(0.9\pm0.3)\times 10^{-5}$ mm/mm/°C.

It is also essential for the film of the present invention that the heat shrinkage after treating the film under temperature and humidity conditions of 60° C. and 80% RH for 72 hours is not greater than 0.09% in any directions in the film plane. The film which does not satisfy this requirement is poor in dimensional stability and unable to increase track density. The shrinkage is more preferably not greater than 0.07%.

Further, the film of the present invention needs to satisfy all of the requirements mentioned below in addition to the shrinkage and expansion property requirements.

Firstly, in the film of the present invention, the refractive index ($n_\alpha$) in its thickness direction must fall within the range of 1.490 to 1.500. If $n_\alpha$ is less than 1.490, the heat shrinkage of the film becomes too large. On the other hand, if $n_\alpha$ exceeds 1.500, the coefficient of thermal expansion of the film is undesirably higher. The preferred range of $n_\alpha$ is 1.490 to 1.496.

The degree of planar orientation ($\Delta P$) of the film of the present invention needs to be in the range of 0.155 to 0.168. If $\Delta P$ exceeds 0.168, the heat shrinkage of the film becomes too large, and if $\Delta P$ is less than 0.155, the coefficient of thermal expansion of the film is undesirably higher. The preferred range of $\Delta P$ is from 0.160 to 0.165.

The film of the present invention is further required to have an average refractive index ($\bar{n}$) in the range of 1.600 to 1.603. If $\bar{n}$ is less than 1.600, the produced film has a large heat shrinkage, and if it exceeds 1.603, the obtained film has a large coefficient of thermal expansion and is also poor in flatness.

Moreover, it is necessary for the film of the present invention that the crystal size of (100) face ($X_{100}$) is in the range of 40 to 60 Å. If $X_{100}$ is less than 40 Å, the heat shrinkage of the film becomes too large, and if it exceeds 60 Å, the coefficient of thermal expansion of the film is undesirably high and the flatness of the film is also deteriorated. The preferred range of $X_{100}$ is 45 to 55 Å, more preferably 50 to 55 Å.

The density of the film of the present invention is in the range of 1.385 to 1.400 g/cm$^3$, preferably 1.385 to 1.395 g/cm$^3$. If it is less than 1.385 g/cm$^3$, the heat shrinkage of the film becomes too large, and if it exceeds 1.400 g/cm$^3$, the coefficient of thermal expansion of the film increases and the flatness of the film is also deteriorated.

Generally it is considered that a low density film is unfavorable for use in a floppy disc because of a large heat shrinkage, but it has been found by the present inventors that in application of film to floppy disc, irreversible change at low temperatures is important, and no problem arises when the heat shrinkage at high temperatures is high to a certain extent. The present invention is further based on this finding.

Also, a film for use in high-density floppy disc is necessary to meet strict requirements in flatness and uniformity in thickness of the film, and such requirements could be met by using the film of the present invention as the base film for a floppy disc.

The film of the present invention is intended to be used for high-density floppy disc, and the film has a surface roughness (Ra) of preferably not greater than 0.015 μm, more preferably not greater than 0.010 μm, further preferably not greater than 0.008 μm In the following, a process for producing the film of the present invention will be described. It is to be understood, however, that various changes and modifications can be made in the below-described process without departing from the scope of the present invention.

A polyester containing, if necessary, fine particles of kaolin, silica, calcium carbonate, silicon oxide, aluminum oxide or the like, together with a stabilizer, coloring agent, defoaming agent, organic lubricant and other additives is dried by a usual method. Then the polyester is extruded through an extruder, cooled and solidified on a rotary cooling device to form a non-stretched sheet. In the cooling step, it is recommended to use a commonly practiced electrostatic cooling technique. The thus obtained film, after sufficient preheating at a temperature from 75° to 120° C. for 0.01 to 10 sec, is stretched 2.8 to 5.0 times in the machine direction in single- or multi-stages at a film temperature of 85° to 130° C. so that the stretched film has a birefringence of not greater than 0.080, preferably not greater than 0.065, more preferably not greater than 0.050. Then the film is further stretched 3.0 to 4.5 times in the transverse direction at a film temperature of 90° to 120° C., followed by heat setting at 180° to 225° C. for 0.1 to 60 sec. In the course of heat setting, the film is usually subjected to 2 to 15% relaxation in the transverse direction. After heat setting, the film is preferably further subjected to 0.1 to 10% relaxation in the machine and/or transverse direction in the cooling zone.

The thickness of the biaxially oriented polyester film for use in floppy disc is preferably 50 to 100 μm, and more preferably 60 to 80 μm.

EXAMPLES

The present invention will hereinafter be described in further detail by way of example thereof. It will be noted that the scope of the present invention is not limited to the example described below. Evaluation of the properties of the obtained films was made according to the following methods.

(1) Refractive Index ($n_\alpha$) in the Thickness Direction of the Film

Refractive index in the thickness direction of the film relative to the sodium D line was measured at 23° C. by using an Abbe's refractometer manufactured by Atago Kogaku K.K.

(2) Degree of Planar Orientation ($\Delta P$)

The maximum value of refractive index in a film plane ($n_\gamma$), the refractive index in the direction perpendicular thereto ($n_\beta$) and the refractive index in the thickness direction of the film ($n_\alpha$) were measured by using an Abbe's refractometer mfd. by Atago Kogaku K.K., and the degree of planar orientation was calculated from the following equation. Measurement of the refractive indices was made by using the sodium D line at 23° C.

$$\text{Degree of planar orientation } (\Delta P) = \frac{(n_\gamma + n_\beta)}{2} - n_\alpha$$

(3) Average Refractive Index $\bar{n}$

The maximum value of the refractive index in a film plane ($n_\gamma$), the refractive index in the direction perpendicular thereto ($n_\beta$) and the refractive index in the thickness direction of the film ($n_\alpha$) were measured by using an Abbe's refractometer mfd. by Atago Kogaku K.K., and the average refractive index was calculated from the following equation. Measurement of the refractive indices was made by using the sodium D line at 23° C.

$$\overline{n} = \frac{(n_\alpha + n_\beta + n_\gamma)}{3}$$

(4) Crystal Size of (100) Face ($X_{100}$)

The half-value width was measured for the crystal of (100) face by using an X-ray diffractometer and the crystal size of (100) face was calculated from the following equation.

$$X_{100} = \frac{0.9 \cdot \lambda}{B \cdot \cos\theta}$$

$A = 2.2896 (\text{Å})$
$B = $ half-value width (radian)

The straight line connecting the points showing the scattering strength of $2\theta = 33°$ and $2\theta = 19°$ was used as the base line. The X-ray output was adjusted to 30 kV and 15 mA.

(5) Coefficient of Thermal Expansion ($\alpha_T$)

By using a constant-load extensometer (Model TL-2, mfd. by Nippon Jido Seigyo K.K.), a temperature-expansion graph was obtained by heating a sample film of 12.2 mm width and 250 mm length (in the measuring direction) at a rate of 15° C./min with a tension of 27 g/mm². Two points for 30° and 50° C. was connected with a straight line and its slope was determined.

As a result of measurements in various directions in the film plane by changing the angles by 10° through the total angle of 180°, the directions in which the minimum and maximum values of the coefficient of thermal expansion were obtained agreed with the main orientation direction ($\gamma$ direction) and the direction ($\beta$ direction) perpendicular to the $\gamma$ direction, respectively, in each sample, so that the measurement was made in the $\gamma$ direction and $\beta$ direction alone.

(6) Dimensional Change Due to Heat and Humidity

A sample film of 10 mm width and 50 mm length was cut out along the measuring direction from each test film. This sample film was cut in half along the longitudinal direction and one of them was left in an oven adjusted to 60° C. and 80% RH for 72 hours in a free end state. The treated and non-treated samples were placed in close attachment to each other and the difference between the ends of both the samples were determined by a microscope. The measurement was repeated changing the measuring direction by 10° in the film plane. The directions in which maximum and minimum values were obtained were the machine direction and transverse direction, respectively.

(7) Evaluation of Flatness

The amount of slack (level difference between crest and trough) of a film when A 1,000 mm wide film was held with a tension of 5 kg between parallel rolls arranged at 2 m intervals and the amount of slack (level difference between crest and trough) of the film was measured. The slack of less than 5 mm was represented by ◯, 5 to 15 mm by Δ, and greater than 15 mm by x.

(8) Evaluation of Suitability for Floppy Disc

Each of the films obtained according to the example of the present invention and the comparative examples was coated on its both sides with a magnetic layer by conventional method and then calendered to make a 3.5 inch floppy disc. The thus obtained floppy discs were treated at 60° C. and 80% RH for 72 hours and their various performances such as modulation were measured. The samples which showed good result were given ◯ mark, those with bad results were given x mark and those with intermediate results were given Δ mark.

EXAMPLE 1

A polyethylene terephthalate (intrinsic viscosity: 0.62) containing 0.33 wt % of spherical silica (average particle size: 0.3 μm) was dried, extruded, cooled and solidified by conventional methods to obtain a non-stretched film. This film was preheated to 100° C., then stretched 2.4 times in the machine direction at a film temperature of 95° C., followed by restretching 1.2 times in the same direction while maintaining the temperature. The birefringence of the monoaxially stretched film was 0.056. Then the monoaxially stretched film was stretched 3.8 times in the transverse direction at 110° C., and heat-set at 200° C. with 5% relaxation in the transverse direction. The film was further relaxed 2% in the transverse direction at 180° C. in the cooling zone. The film was taken up at a speed slower than the rail speed of the tenter by 0.01 m/min for relaxing the film in the machine direction to obtain a biaxially oriented polyester film with a thickness of 75 μm.

COMPARATIVE EXAMPLE 1

The non-stretched film obtained in Example 1 was stretched 3.7 times in the machine direction at 87° C., further stretched 3.8 times in the transverse direction at 100° C., and then heat set at 232° C. to obtain a 75 μm thick film.

COMPARATIVE EXAMPLES 2 AND 3

By following the same procedure as Comparative Example 1 except that the heat setting temperature alone was changed to 250° C. in Comparative Example 2 and to 200° C. in Comparative Example 3, there were obtained the films having the properties shown in Table 1 and their suitability for floppy disc was evaluated.

The results obtained in the above Example 1 and Comparative Examples 1 to 3 are shown collectively in Table 1.

TABLE 1

| | Thermal Expansion coefficient ($\alpha_T$) | | Dimensional change due to temperature and humidity | | Refractive | Degree of |
| --- | --- | --- | --- | --- | --- | --- |
| | $\gamma$ direction ($\times 10^{-5}$ mm/mm/°C.) | $\beta$ direction ($\times 10^{-5}$ mm/mm/°C.) | Maximum direction (%) | Minimum direction (%) | index in thickness direction $n_\alpha$ | planar orientation $\Delta P$ |
| Example 1 | 0.9 | 1.2 | 0.07 | 0.03 | 1.493 | 0.164 |
| Comp. | 1.6 | 1.9 | 0.065 | 0.065 | 1.398 | 0.170 |

TABLE 1-continued

|  |  |  |  |  |  |  |
|---|---|---|---|---|---|---|
| Example 1 Comp. Example 2 | 1.8 | 2.9 | 0.032 | 0.032 | 1.492 | 0.168 |
| Comp. Example 3 | 0.9 | 1.1 | 0.152 | 0.152 | 1.490 | 0.171 |

|  | Average refractive index $\bar{n}$ | (100) face crystal size $X_{100}$(Å) | Density $\rho$(g/cm$^3$) | Evaluation of flatness | Evaluation of suitability for floppy disc |
|---|---|---|---|---|---|
| Example 1 | 1.6022 | 51 | 1.390 | ○ | ○ |
| Comp. Example 1 | 1.6042 | 56 | 1.398 | △ | X |
| Comp. Example 2 | 1.6073 | 72 | 1.403 | X | X |
| Comp. Example 3 | 1.6020 | 52 | 1.392 | ○ | X |

What is claimed is:

1. A biaxially oriented polyester film for use in a floppy disc, which has a coefficient of thermal expansion ($\alpha_T$) in film plane of $(1.0\pm0.5)\times10^{-5}$ mm/mm/°C. and a heat shrinkage of not higher than 0.09% after treating the film for 72 hours under conditions of a temperature of 60° C. and a humidity of 80% RH in any directions in film plane, and simultaneously satisfies the following equations (1) to (5):

$$1.490 \leq n_\alpha \leq 1.500 \quad (1)$$

$$0.155 \leq \Delta P \leq 0.168 \quad (2)$$

$$1.600 \leq \bar{n} \leq 1.603 \quad (3)$$

$$40 \leq X_{100} \leq 60 \quad (4)$$

$$1.385 \leq \rho \leq 1.400 \quad (5)$$

wherein $n_\alpha$ represents a refractive index in film thickness direction, $\Delta P$ represents a degree of planar orientation, $\bar{n}$ represents an average refractive index, $X_{100}$ represents a crystal size (Å) of (110) face, and $\rho$ represents a density (g/cm$^3$).

2. The biaxially oriented polyester film according to claim 1, wherein 80 mol % or more of the constitutional repeating units of said polyester is ethylene terephthalate unit or ethylene 2,6-naphthalate unit.

3. The biaxially oriented polyester film according to claim 1, wherein the intrinsic viscosity of said polyester is not less than 0.40.

4. A process for producing the biaxially oriented polyester film according to claim 1, which comprises the steps of:

extruding a polyester through an extruder into a non-stretched sheet, preheating the sheet at a temperature from 75° to 120° C. for 0.01 to 10 sec, stretching the preheated sheet 2.8 to 5.0 times in the machine direction at a film temperature of 85° to 130° C. so that the birefringence of the stretched film is not less than 0.080, stretching the monoaxially stretched film 3.0 to 4.5 times in the transverse direction at a film temperature of 90° to 120° C., and heat-setting the biaxially stretched film at a temperature of 180° to 225° C. with 2 to 15% relaxation in the transverse direction.

* * * * *